(12) United States Patent
Ueno

(10) Patent No.: US 6,668,205 B1
(45) Date of Patent: Dec. 23, 2003

(54) CONTROL METHOD OF FACTORY AUTOMATION SYSTEM, RECORDING MEDIUM RECORDING A PROGRAM THEREFOR AND CENTRAL PROCESSOR OF FACTORY AUTOMATION SYSTEM

(75) Inventor: Masayuki Ueno, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/457,690

(22) Filed: Dec. 9, 1999

(30) Foreign Application Priority Data

Jun. 30, 1999 (JP) .......................................... 11-185414

(51) Int. Cl.$^7$ ............................................. G06F 19/00
(52) U.S. Cl. ................. 700/96; 700/4; 700/19; 700/20; 700/49; 700/104; 700/9
(58) Field of Search .............................. 700/2–5, 9, 19, 700/20, 23, 49, 52, 53, 65, 66, 96, 104

(56) References Cited

U.S. PATENT DOCUMENTS

| | | | | |
|---|---|---|---|---|
| 4,831,582 A | * | 5/1989 | Miller et al. ............. | 707/104.1 |
| 4,870,590 A | * | 9/1989 | Kawata et al. ............. | 700/115 |
| 5,175,864 A | * | 12/1992 | Tairaku et al. ................. | 712/1 |
| 5,303,873 A | * | 4/1994 | Oe ........................... | 242/486.3 |
| 5,353,284 A | * | 10/1994 | Shiobara ..................... | 370/463 |
| 6,282,457 B1 | * | 8/2001 | Miura et al. ................ | 700/121 |

FOREIGN PATENT DOCUMENTS

GB          9-50312          2/1997     ......... G05B/19/418

* cited by examiner

*Primary Examiner*—Ramesh Patel
(74) *Attorney, Agent, or Firm*—Sughrue Mion, PLLC

(57) ABSTRACT

A central processor of a factory automation system which has an application program 13 for issuing instructions to a plurality of controllers 1 to 4 in parallel and controlling the controllers 1 to 4, a plurality of interface 30*a*, 30*b* for connecting the application program 13 and the controllers 1 to 4, and interface control 35*c* for dynamically increasing or decreasing the number of the interface 30*a*, 30*b* in response to the number of the instructions issued by the application program 13 to the controllers 1 to 4 in parallel.

7 Claims, 11 Drawing Sheets

CONTROL METHOD OF FACTORY AUTOMATION SYSTEM, RECORDING MEDIUM RECORDING A PROGRAM THEREFOR AND CENTRAL PROCESSOR OF FACTORY AUTOMATION SYSTEM

BACKGROUND OF THE INVENTION

1. Field of the Invention

This invention relates to a factory automation (FA) system and more particularly to a central controller such as a personal computer for controlling controllers, such as a programmable controller (PC), a numerical control (NC), a servo controller (SC), and a robot controller (RC), a control method of the central controller, and a recording medium recording a program.

2. Description of the Related Art

In recent years, occasions where a program logic controller (PLC) system, an NC system, an SC system, and an RC system (containing a combination thereof) are connected to a personal computer for use have increased because of enrichment of data processing and man-machine interfaces. Available as a system connecting them is, for example, a system used as system monitoring or an input/output interface (display, etc.,).

Hitherto, to develop such an application program, a library provided for each of the PLC, NC, SC, and RC systems has been used.

FIG. 12 is a functional block diagram of an FA system described in JP-A-09-050312. In FIG. 12, numeral 103 denotes a PLC controlled by a controller, numeral 111 denotes a PLC communication board placed in the controller for communicating with the PLC 103, numerals 113, 116, and 118 denote memories used for processing of the controller, and numeral 113a denotes a user program for transmitting and receiving data to and from the PLC 103.

Next, transmission and reception of data in the FA system will be discussed. First, the user program 113a writes a transmission request into a request data area 116a. Subsequently, a transmission and reception function 118a reads the transmission request written into the request data area 116a, determines the party to which the transmission request is to be sent based on the channel number described in the transmission request, and sends the transmission request to the PLC 103 through a PLC communication function 118e and the PLC communication board 111, for example. The PLC 103 responds to the transmission request with necessary data and the transmission and reception function 118a receives the data through the PLC communication function 118e and the PLC communication board 111 and writes the received data into a response data area 116b, then the user program 113a reads the data from the response data area 116b.

The access system in the related art is thus configured and therefore involves the following problem:

The FA system in the related art uses the channel number for making it possible to transmit and receive data and comprises one transmission and reception function to change the party to and from which data is to be transmitted and received based on the channel number. That is, one transmission and reception function 118a manages all transmission and reception of the user program 113a. Since instructions sent to the transmission and reception function 118a are processed sequentially, if a time-consuming instruction and an instruction that can be processed at high speed are mixed, the instruction that can essentially be processed at high speed must wait until completion of the time-consuming instruction and processing cannot be speeded up.

SUMMARY OF THE INVENTION

It is therefore an object of the invention to provide an FA system control method capable of executing a plurality of instructions efficiently, a recording medium recording a program therefor, and a central controller.

To the end, according to the invention, there is provided a control method of a factory automation system wherein a central controller for controlling a factory automation system using a plurality of controllers controls first and second ones of the controllers, the method comprising the generation step of starting a plurality of interface means by generating new interface means in addition to already existing interface means, the first transmission step of transmitting a first instruction for controlling the first controller to one of the interface means by control means being placed in the central controller and having a control procedure of the controllers, the second transmission step of transmitting by the control means a second instruction for controlling the second controller to different one of the interface means from the interface means to which the first instruction is transmitted, the parallel execution step being executed after the first and second transmission steps, the parallel execution step of executing the first instruction by the interface means and executing the second instruction by the different interface means in parallel with execution of the first instruction, the third transmission step being executed after the parallel execution step, the third transmission step of transmitting the process result for the first instruction to the control means by the interface means, the fourth transmission step being executed after the parallel execution step, the fourth transmission step of transmitting the process result for the second instruction to the control means by the different interface means, and the end step being executed after the fourth transmission step, the end step of releasing the resources occupied by the different interface means and terminating the different interface means.

The method further comprises the step being executed after the end step, the step of receiving the process result transmitted at the third transmission step and processing the received process result by the control means.

According to the invention, there is provided a recording medium recording a program for causing a computer to execute the generation step at which if a request for controlling a controller is issued from an application program to a library and a control process provided in the library is called, the library generates a new thread, whereby a plurality of threads are assigned to the library, the return step at which the library uses one of the threads to return execution right to the application program before the library receives the process result from the controller corresponding to the process of the controller, the first control step at which the library uses different one of the threads from the one thread to execute the process of the controller and control the controller in parallel with the application program restarting execution to which the execution right is returned at the return step, and the step being executed after the return step, the step of transmitting the process result of the controller from the library executed using the different thread to the application program executed using the one thread.

The recording medium records a program for causing a computer to execute the additional steps of the request step being executed after the return step at which the application program uses the one thread to request the library to control a different controller, the second control step at which the library receives the request made at the request step and controls the different controller in parallel with the first control step, and the end step being executed after the transmission step at which the library executed using the different thread terminates the different thread.

According to the invention, there is provided a central processor of a factory automation system comprising control means for issuing instructions to a plurality of controllers in parallel and controlling the controllers, a plurality of interface means for connecting the control means and the controllers, and interface control means for dynamically increasing or decreasing the number of the plurality of interface means in response to the number of the instructions issued by the control means to the controllers in parallel.

The interface control means senses that the control means sends an instruction to the interface means, and increases the interface means.

The interface control means increases the interface means in response to the type of instruction and for an instruction having a shorter processing time than the instruction for increasing the interface means has, the interface control means does not increase the interface means and causes already existing interface means to execute the instruction having a shorter processing time.

DETAILED DESCRIPTION OF THE PREFERRED EMBODIMENTS

Figure 1:
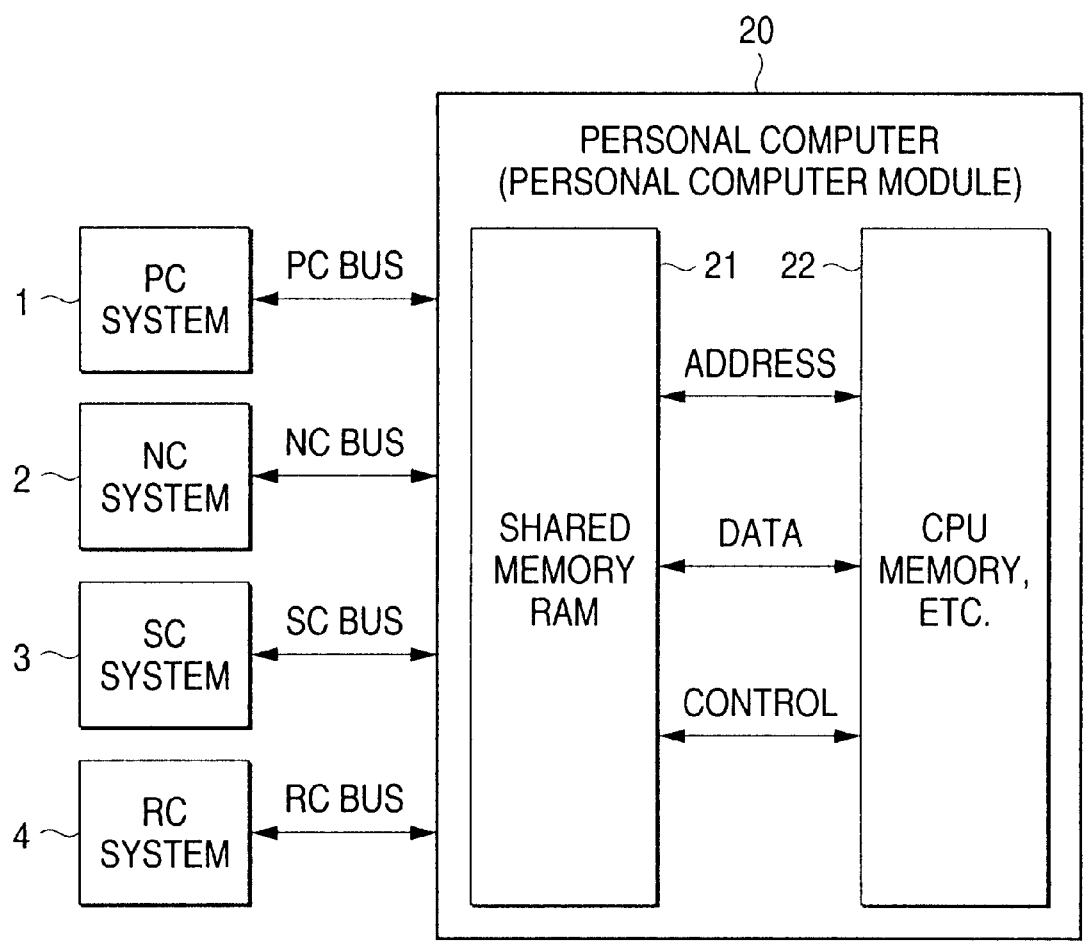
FIG. 1 is a functional block diagram to represent hardware of a factory automation system in a first embodiment of the invention.

First Embodiment:

FIG. 1 is a functional block diagram to show hardware of an FA system in a first embodiment of the invention. In FIG. 1, numerals 1 to 4 denote controllers, namely, numeral 1 denotes a PC system, numeral 2 denotes an NC system, numeral 3 denotes an SC system, and numeral 4 denotes an RS system. Numeral 20 denotes a central controller for controlling the controllers 1 to 4, such as a personal computer generally coming into widespread use. The personal computer 20 has a processor (CPU (central processing unit)) and general-purpose memory and comprises an execution section 22 for executing an application program and shared memory 21.

Instructions and data are transferred between the personal computer 20 and the PC system 1 through the shared memory 21 as shown in the figure. The shared memory 21 is made of a dual-port RAM (random-access memory) device that can be read and written from the CPU of the execution section 22 and the CPU of the PC system 1 or a circuit block comprising a normal RAM device to which an external circuit is added for providing a similar effect. Since the personal computer 20 and the PC system 1 access each other through the shared memory 21, even if they differ in hardware, easy access can be executed; the personal computer 20 and the PC system 1 can advance processing in parallel without the need for synchronizing with each other, for example. Thus, system performance can be enhanced.

Likewise, instructions and data are also transferred between the personal computer 20 and the NC system 2, between the personal computer 20 and the SC system 3, and between the personal computer 20 and the RC system 4 through the shared memory 21 as shown in the figure.

Figure 2:
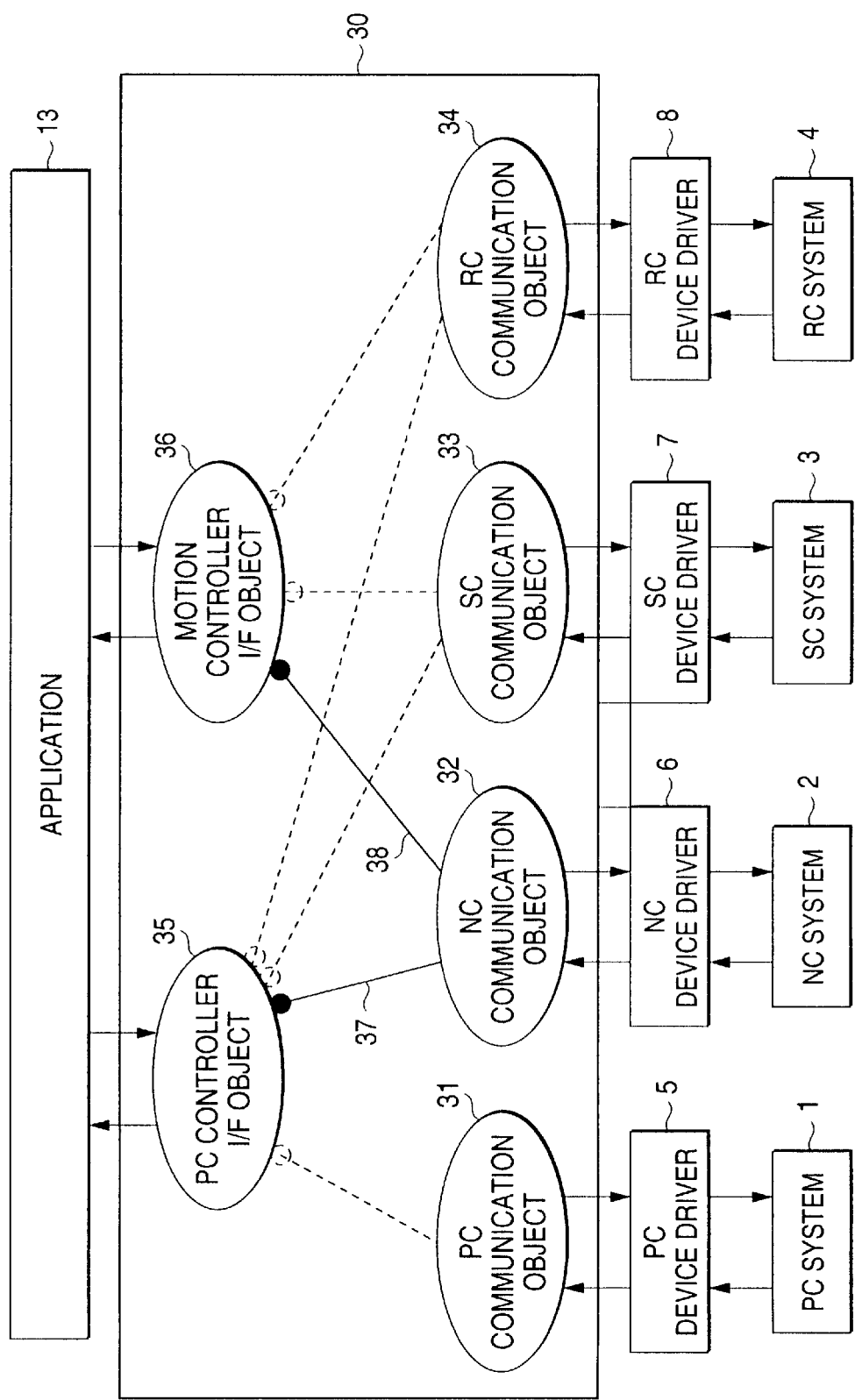
FIG. 2 is a functional block diagram to represent the software configuration of the factory automation system in the first embodiment of the invention.

FIG. 2 is a functional block diagram to show the software configuration of the FA system in the embodiment. Parts identical with or similar to those previously described with reference to FIG. 1 are denoted by the same reference numerals in FIG. 2. A PC device driver 5 is the most basic driver for executing data exchange (read/write) with the PC system 1 through the shared memory 21. It accesses the hardware resources in the PC system 1 and directly drives the PC system 1. Likewise, an NC device driver 6 is a driver for executing data exchange with the NC system 2, an SC device driver 7 is a driver for executing data exchange with the SC system 3, and an RC device driver 8 is a driver for executing data exchange with the RC system 4. Numeral 13 denotes an application program for driving the controllers 1 to 4 and numeral 30 denotes an interface program for executing data communication between the application program 13 and the device drivers 5 to 8 and controlling the controllers upon reception of an instruction from the application program 13. For example, the interface program 30 can be provided for the user as a dynamic link library used by the application program 13. In the embodiment, the application program 13 is control means and the interface program 30 contains interface means and interface control means.

The interface program 30 comprises a PC communication object 31, an NC communication object 32, an SC communication object 33, an RC communication object 34, a PC controller interface object 35, and a motion controller interface object 36.

Figure 3:
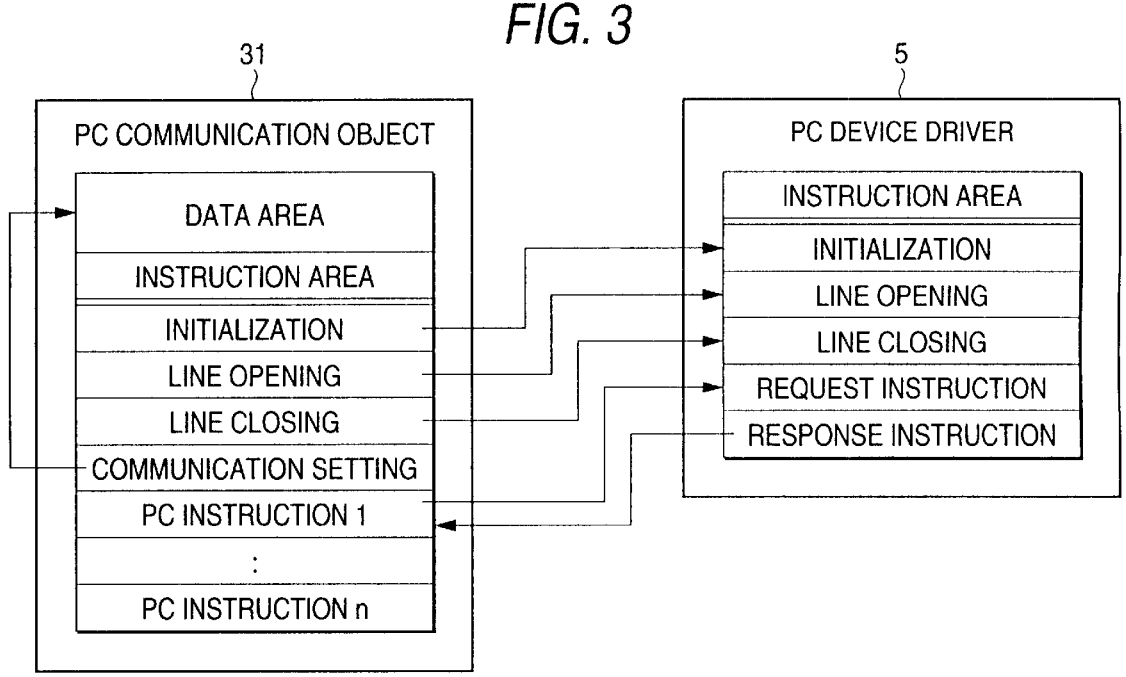
FIG. 3 is a memory map of a PC communication object in the first embodiment of the invention.

The PC communication object 31 is an object for accessing the PC system 1 through the PC device driver 5 and plays roles in connecting and disconnecting a communication line to and from the PC system 1 through the PC device driver 5 and exchanging data with the PC system 1 after the communication line is connected. To execute instructions for connecting and disconnecting the line and exchanging data, the objects in the application program 30 use messaging of the objects. The PC communication object 31 has a number of PC instructions as shown on a memory map of FIG. 3; for example, a program for preparing an instruction message and transmitting the instruction message to the PC device driver 5 upon reception of a PC operating instruction from the PC controller I/F object 35 is described in the instruction area of the PC instructions. Each of the objects 31 to 36 comprises a data area for storing various pieces of data and an instruction area for storing a program.

Figure 4:
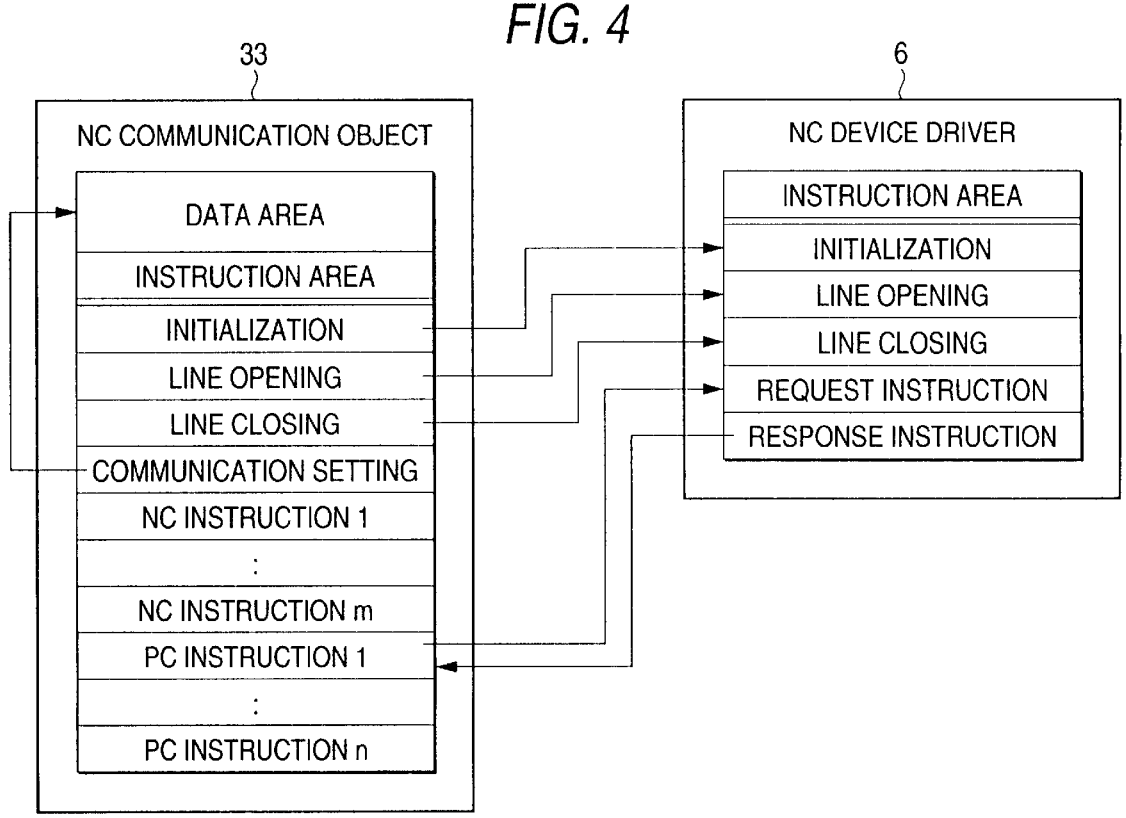
FIG. 4 is a memory map of an NC communication object in the first embodiment of the invention.

Likewise, the NC communication object 32 is an object for accessing the NC system 2 through the NC device driver 6. It plays roles in connecting and disconnecting a communication line between the personal computer 20 and the NC system 2 and exchanging data with the NC system 2 and executes the operation through the NC driver 6. An instruction given to the NC communication object 32 is executed by messaging of the object. The NC communication object 32 has PC instructions 1 to n similar to those of the PC communication object 31, as shown in FIG. 4. The PC instructions 1 to n are related to the PC functions contained in the NC system 2.

Likewise, the SC communication object 33 is an object for accessing the SC system 3 through the SC device driver 7. It plays roles in connecting and disconnecting a communication line between the personal computer 20 and the SC system 3 and exchanging data with the SC system 3 and executes the operation through the SC driver 7. The SC communication object 33 has PC instructions 1 to n similar to those of the PC communication object 31 in addition to instructions corresponding to the functions unique to the SC.

Likewise, the RC communication object 34 is an object for accessing the RC system 4 through the RC device driver 8. It plays roles in connecting and disconnecting a communication line between the personal computer 20 and the RC system 4 and exchanging data with the RC system 4 and executes the operation through the RC driver 8. The RC communication object 34 has PC instructions 1 to n similar to those of the PC communication object 31 in addition to instructions corresponding to the functions unique to the RC.

In the embodiment, the functions of the controllers 1 to 4 are roughly classified into the two types. For example, the PC system 1 has the PC function and each of the NC system 2, the SC system 3, and the RC system 4 has two types of functions, namely, PC function and motion function. The motion function is a function of controlling one or more servo motors; specifically, the function proper to the system inherited from the motion function, namely, the NC function in the NC system, the SC function in the SC system 3, and the RC function in the RC system 4.

Figure 5:
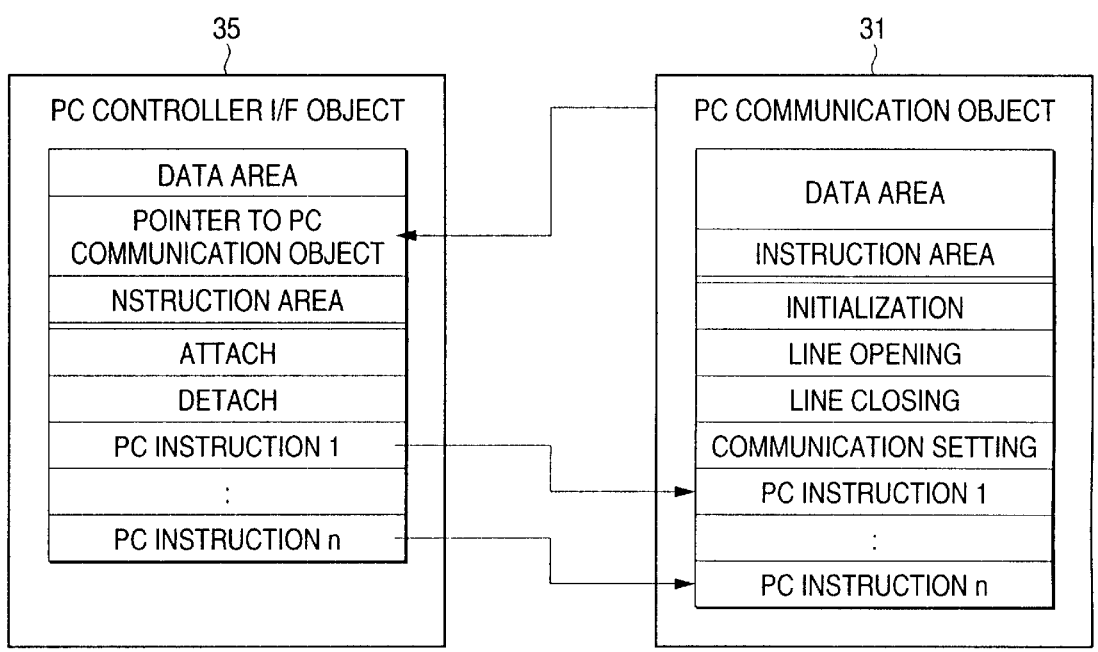
FIG. 5 is a memory map of a PC controller I/F object in the first embodiment of the invention.

Controller interface (I/F) objects are provided by putting the functions into objects using a project-oriented technology. The PC controller I/F object 35 is placed so that it can connect to the PC communication object 31, the NC communication object 32, the SC communication object 33, and the RC communication object 34. The PC controller I/F object 35 receives an instruction concerning the PC function from the application program 13, converts the received instruction into an instruction for the corresponding communication object 31 to 34, and causes the corresponding communication object 31 to 34 to execute the resultant instruction. The PC controller I/F object 35 can store a pointer to each connected communication object 31 to 34 in a data area and also stores attach and detach programs executed at the connecting time and a plurality of PC operating instructions for controlling the PC function using the PC instructions of each communication object 31 to 34 in the data area, as shown in FIG. 5.

The motion controller I/F object 36 is placed so that it can connect to the NC communication object 32, the SC communication object 33, and the RC communication object 34. The motion controller I/F object 36 receives an instruction concerning the motion function from the application program 13, converts the received instruction into an instruction for the corresponding communication object 32 to 34, and causes the corresponding communication object 32 to 34 to execute the resultant instruction.

The device drivers 5 to 8 and the objects 31 to 36 in the application program 30 in FIG. 2 are executed by the execution section 22 in the personal computer 20. Like the PC controller I/F object 35, the motion controller I/F object 36 can store a pointer to each connected communication object 32 to 34 in a data area and also stores attach and detach programs executed at the connecting time and a plurality of instructions for controlling the motion function of each communication object 32 to 34 in the data area.

The application program 13 can message to the controller I/F objects 35 and 36, thereby indirectly accessing the controllers 1 to 4 of hardware without considering the different controllers 1 to 4.

The concept itself of the object-oriented technology used in the invention is described in reference documents, such as "Ishizuka, Object shikou programming, ASCII shuppan, 1988" and "Sakai, Object shikou nyuumon, Ohm sha, 1990."

Figure 6:
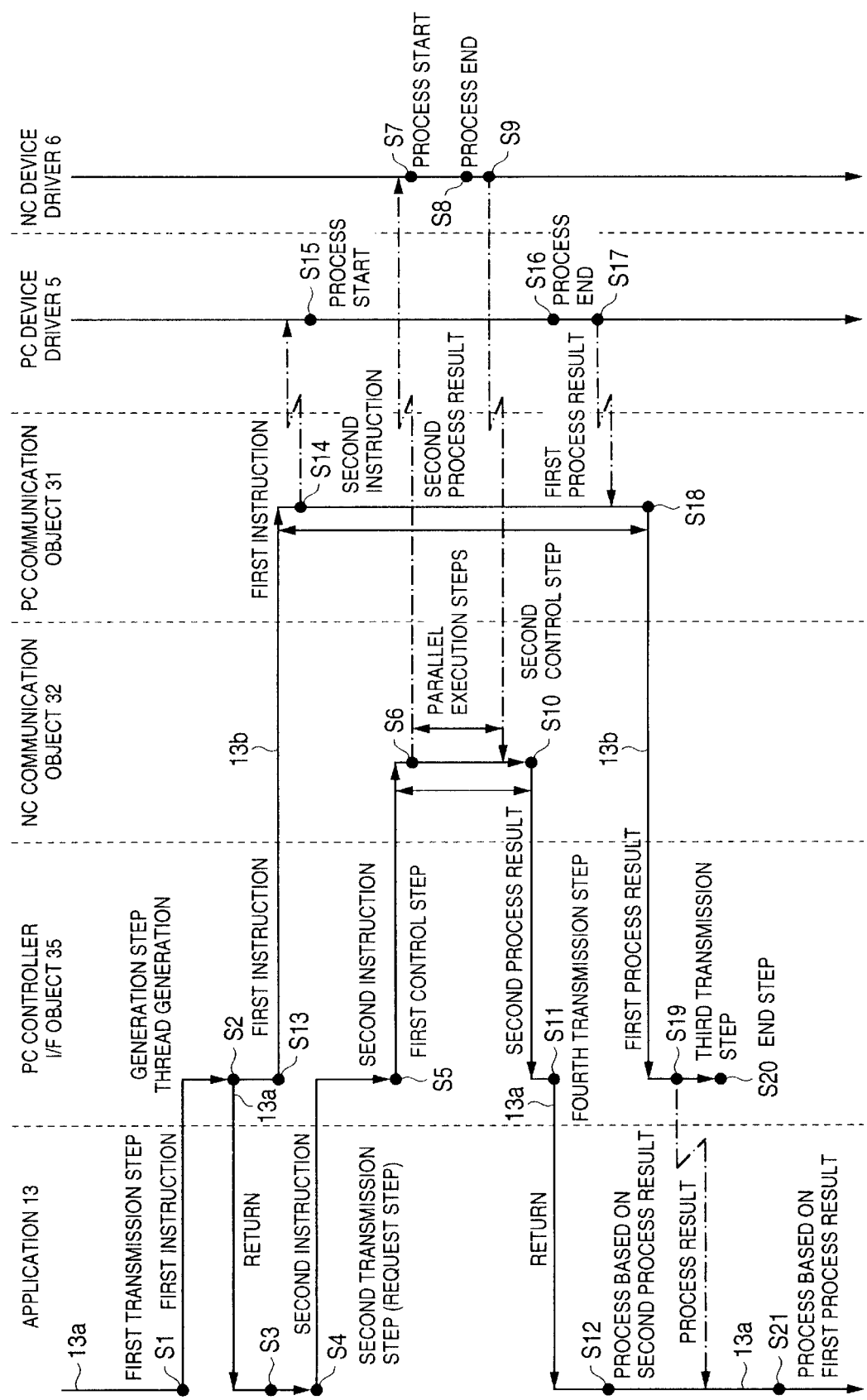
FIG. 6 is a sequence chart to show a control procedure of a personal computer in the first embodiment of the invention.

Next, the operation of the FA system in the embodiment will be discussed. FIG. 6 is a sequence chart to show control executed by the execution section 22 in the personal computer 20. Parts identical with or similar to those previously described with reference to FIG. 2 are denoted by the same reference numerals in FIG. 6.

The embodiment is characterized by the fact that if processing for one controller and that for another controller are executed in parallel and one processing takes long time, the other can be executed at high speed. That is, long processing of steps S15 to S17 executed in the PC device driver 5 and short processing of steps S7 and S8 executed in the NC device driver 6 are executed in parallel and the application program 13 first receives the result of the short processing and can execute processing step S12 based on the processing result. That is, the processing for the NC system 2 later occurring can be first executed, thus the personal computer 20 can complete more than one process at high speed as a whole. Particularly, in inquiry processing, etc., for the controller, hitherto, it has been necessary for the central processor to wait until reception of the processing result from the controller; however, according to the embodiment, any other processing can be executed during the waiting and high-speed processing is enabled.

The detailed operation is as follows: First, assume that the application program 13 is executed using one thread 13a by the processor of the personal computer 20. The thread is a CPU time assignment unit when the processor executes more than one process in parallel, namely, an execution unit. Next, at first transmission step S1, the application program 13 calls a method for executing the first instruction given to the first controller (for example, PC system 1) to the PC controller I/F object 35. Then, the process of the thread 13a is transferred to execution of the method of the PC controller I/F object 35 and at generation step S2, the PC controller I/F object 35 prepares a new thread 13b and returns process to the application program 13.

The generation step S2 enables the personal computer 20 to execute more than one process in parallel. At steps S5 to S11 described later, the PC controller I/F object 35 and the NC communication object 32 in the thread 13a execute control for the NC system 2 as one interface means; on the other hand, at steps S13 to S19 described later, the PC controller I/F object 35 and the PC communication object 31 in the thread 13b execute control for the PC system 1 as another interface means in parallel.

The process for the PC controller I/F object 35 to return the execution right to the application program 13 is a return step. Parallel execution of the new thread 13b is started and the operation of the new thread 13b will be described later.

Next, at step S13, the application program 13 performs another process in parallel with the thread 13b in the thread 13a. This process is an arbitrary process and step S4 may be directly executed following step S2 without executing the process. Subsequently, at second transmission step S4, the application program 13 calls a method for executing the second instruction given to the second controller (for example, NC system 2). (The second transmission step S4 is also a request step for making a request for controlling another controller.) Then, the process of the thread 13a is transferred to the PC controller I/F object 35 and at step S5, the PC controller I/F object 35 determines the party to which the second instruction is to be sent, and transmits the second instruction to the determined party (in this case, the NC communication object 32). At this time, the PC controller I/F object 35 determines the party to which the second instruction is to be transmitted (transmission destination) based on information indicating the transmission destination from the application program 13. The information indicating the transmission destination is sent to the PC controller I/F object 35 by the application program 13 which performs attach operation. (This operation will be described later.)

Next, at step S6, the process of the thread 13a is transferred to the NC communication object 32, which then starts process for the NC device driver 6 based on the second instruction received. For example, if the second instruction is a data transfer request issued to the NC system 2, at step S6, the NC communication object 32 transmits a data transfer request to the NC device driver 6.

Subsequently, at step S7, the NC device driver 6 starts process based on the second instruction received. Instructions and data are transferred between the NC device driver 6 and the NC system 2 via the shared memory 21 in FIG. 1. The NC system 2 reads the instruction or data stored in the shared memory 21 via the NC bus and executes process based on the read instruction. For example, if the instruction sent from the NC device driver 6 is a data transfer request, the NC system 2 reads the data specified in the instruction and writes the read data into the shared memory 21 via the NC bus.

Next, at step S8, the NC communication object 32 reads the data written by the NC system 2 from the shared memory 21. Upon completion of the process of the NC device driver 6, at step S9, the NC device driver 6 transmits the second process result corresponding to the second instruction to the NC communication object 32.

Subsequently, at step S10, the NC communication object 32 transmits the second process result received to the PC controller I/F object 35. The process of the NC communication object 32 from step S6 to step S10 described above is the first control step; here, steps S14 to S18 forming the second control step are executed in parallel in the PC communication object 31. That is, steps S6 to S10 are also parallel execution steps.

Next, at fourth transmission step S11, the PC controller I/F object 35 returns the second process result received to the application program 13 and transfers the process of the thread 13a to the application program 13.

Next, at step S12, the application program 13 executes the next process based on the second process result received at step S11. For example, if the second instruction is a data transfer request, the application program 13 performs a process using the requested data, displays the data on a computer display, or the like.

The process of the thread 13a from step S1 to step S12 has been described. Next, the process in a new thread 13b generated at step S2 will be discussed.

When the PC controller I/F object 35 generates the new thread 13b in the thread 13a at generation step S2, the PC controller I/F object 35 operating in the thread 13b starts step S13 in parallel with the thread 13a. At step S13, the PC controller I/F object 35 transmits the first instruction to the controller. Here, the PC controller I/F object 35 controls the PC system 1 and thus transmits the first instruction to the PC communication object 31.

Next, at step S14, the process of the thread 13b is transferred to the PC communication object 31, which then transmits the first instruction received to the PC device driver 5. Here, if more than one process is required for changing the instruction format or executing the first instruction received, the processes may be executed at step S14 and more than one instruction may be transmitted to the PC device driver 5.

Subsequently, at step S15, the NC device driver 6 executes the instruction received from the PC communication object 31 and controls the PC system 1 via the shared memory 21 as described above. Here, it may take time in the operation of the PC system 1 and it may take time until completion of the process. For example, the time taken for controlling the PC system 1 at steps S15 and S16 may become longer than the time taken for controlling the NC system 2 at steps S7 and S8.

Next, at step S16, upon completion of the process of the PC device driver 5 based on the instruction transmitted at step S14, at step S17, the PC device driver 5 transmits the first process result corresponding to the first instruction to the PC communication object 31.

The PC communication object 31, which receives the first process result, transmits the first process result to the PC controller I/F object 35 at step S18. Here, the process performed by the PC controller I/F object 35 and the PC communication object 31 at steps S13 to S18 described above is the second control step.

Next, at third transmission step S19, the PC controller I/F object 35 transmits the first process result to the application program 13 operating in the thread 13a. Here, the first process result may be transmitted asynchronously using a global variable common to the threads 13a and 13b or using different thread-to-thread communication, synchronous communication may be executed after the application program 13 enters a state in which it can receive data for transmitting the first process result from the thread 13b to the thread 13a.

Subsequently, at end step S20, the PC controller I/F object 35 executed in the thread 13b terminates its own thread 13b and releases the resources of the CPU time, etc. Therefore, the resources of the personal computer 20 that can be used in any other thread or process are increased and the FA system can be operated efficiently.

On the other hand, the application program 13 operating in the thread 13a receives the first process result transmitted at step S19 and at step S21, executes process based on the first process result received.

The case where the PC system 1 and the NC system 2 are controlled in parallel has been described. To control any other controller, such as the SC system 3 or the RC system 4, the corresponding SC or RC communication object 33 or 34 and the corresponding controller I/F object 35 or 36 operate in a similar manner.

As described above, in the embodiment, the controller I/F objects 35 and 36 and the communication objects 31 to 34 can be executed in parallel in response to the situation, the process for one controller can be executed without waiting for completion of the process for any other controller, and the FA system can be operated at high speed.

In the embodiment, interface control means is placed in the library of the PC controller I/F object 35, etc., for dynamically controlling the number of interface means.

FIGS. 7 to 10 are block diagrams to describe an increase or decrease in the interface means in the first embodiment. Parts identical with or similar to those previously described with reference to FIGS. 2 and 6 are denoted by the same reference numerals in FIGS. 7 to 10. Numeral 35a denotes one PC controller I/F object 35 executed in the thread 13a described above and numeral 35b denotes another PC controller I/F object 35 executed in the thread 13b.

Numeral 35c, 35d denotes interface control means placed in the PC controller I/F object 35 for determining whether or not a new thread needs to be generated for each method called from the application program 13 and generating a new thread based on the determination. For example, if one control for the PC system 1 takes time in processing, the interface control means 35c, 35d generates a new thread and causes the control for the PC system 1 to be executed in the new thread. For example, if a time-consuming method is called from the application program 13, an instruction for generating a new thread is placed in the method, whereby the function can be provided.

The interface control means 35c, 35d not only generates a new thread, but also terminates the new generated thread if it determines that the process for the controller terminates. For example, to terminate a new thread, if an instruction for terminating a thread is placed at the end of the method of the PC controller I/F object 35, the new generated thread can be terminated.

Figure 7:
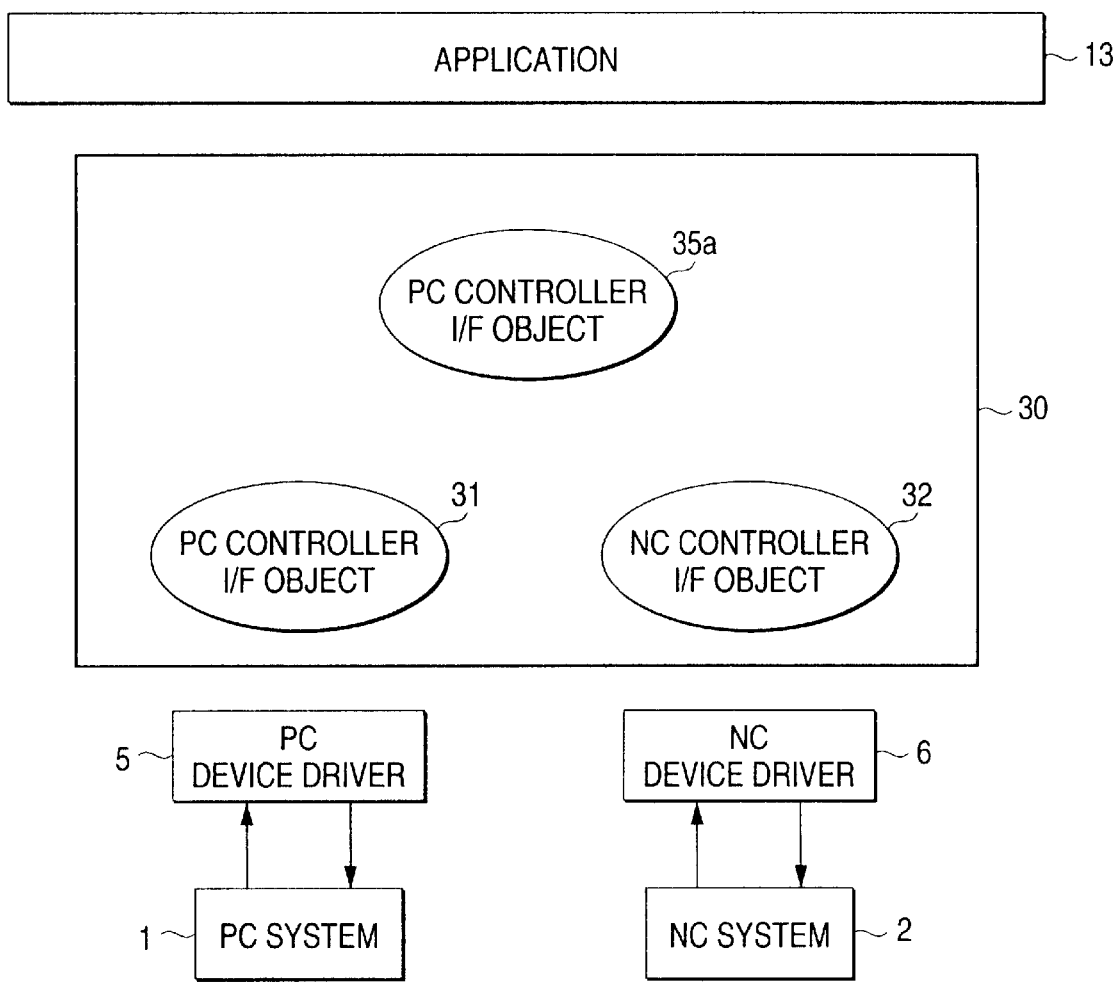
FIG. 7 is a functional block diagram to show the factory automation system in the first embodiment of the invention.

To start control for the controller, the number of interface control means 35 is one as in FIG. 7. Of course, a plurality of interface control means 35 may be already started; however, for simplicity, it is assumed that one interface control means 35 is started.

Figure 8:
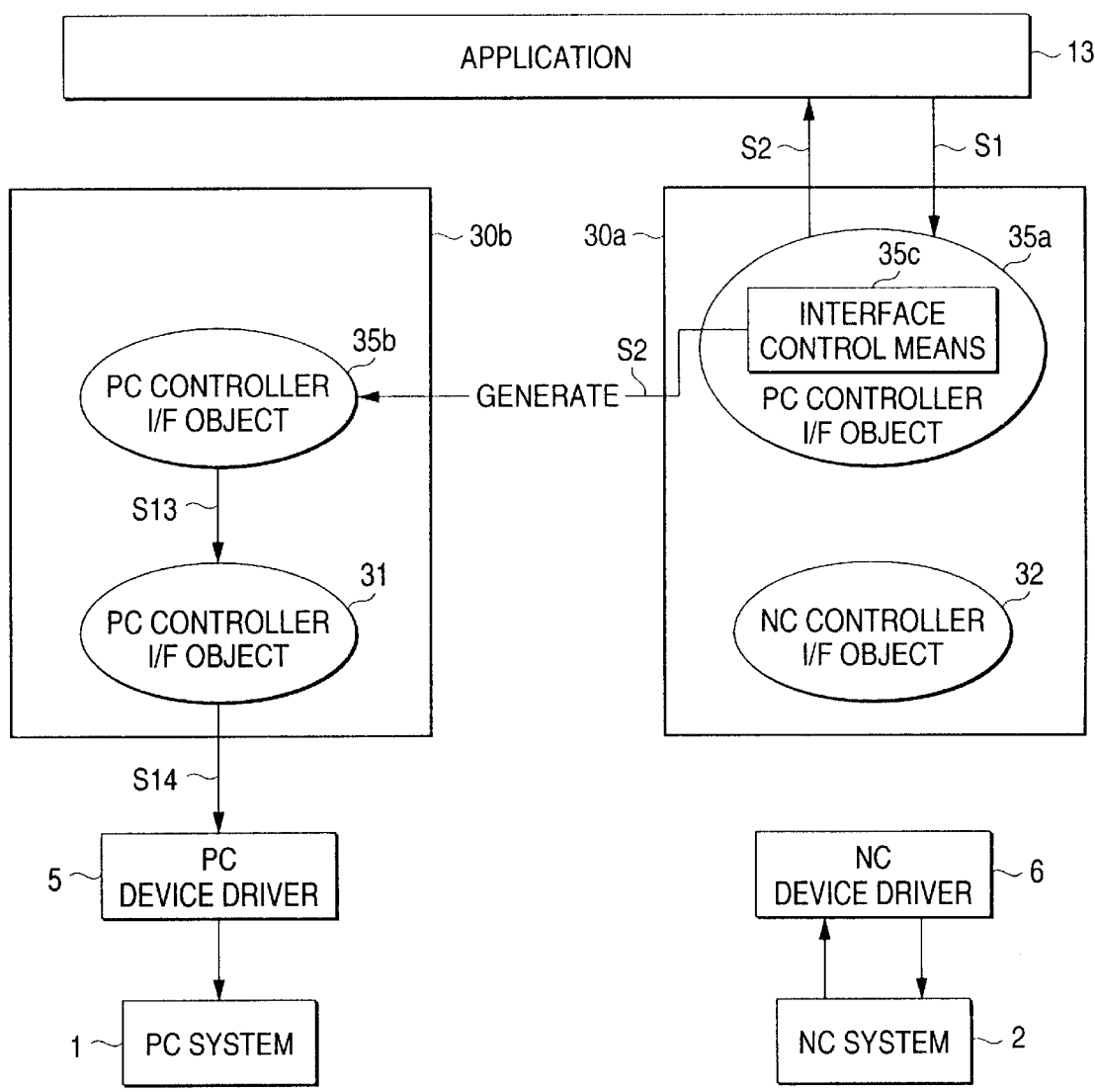
FIG. 8 is a functional block diagram to show the factory automation system in the first embodiment of the invention.

Next, if a method of the interface control means 35 is called at step S1 from the application program 13 as shown in FIG. 8, the interface control means 35c determines whether or not new thread 13b is to be started in response to the called method. Here, the new thread 13b is started as at step S2 described above, whereby the same effect as the PC controller I/F object 35a and the like are copied is produced and PC controller I/F object 35b executed in the new thread 13b is generated.

In the new generated PC controller I/F object 35b, the PC system 1 is controlled through the PC communication object 31, etc., as previously described with reference to FIG. 6. On the other hand, the PC controller I/F object 35a returns the execution right to the application program 13.

Figure 9:
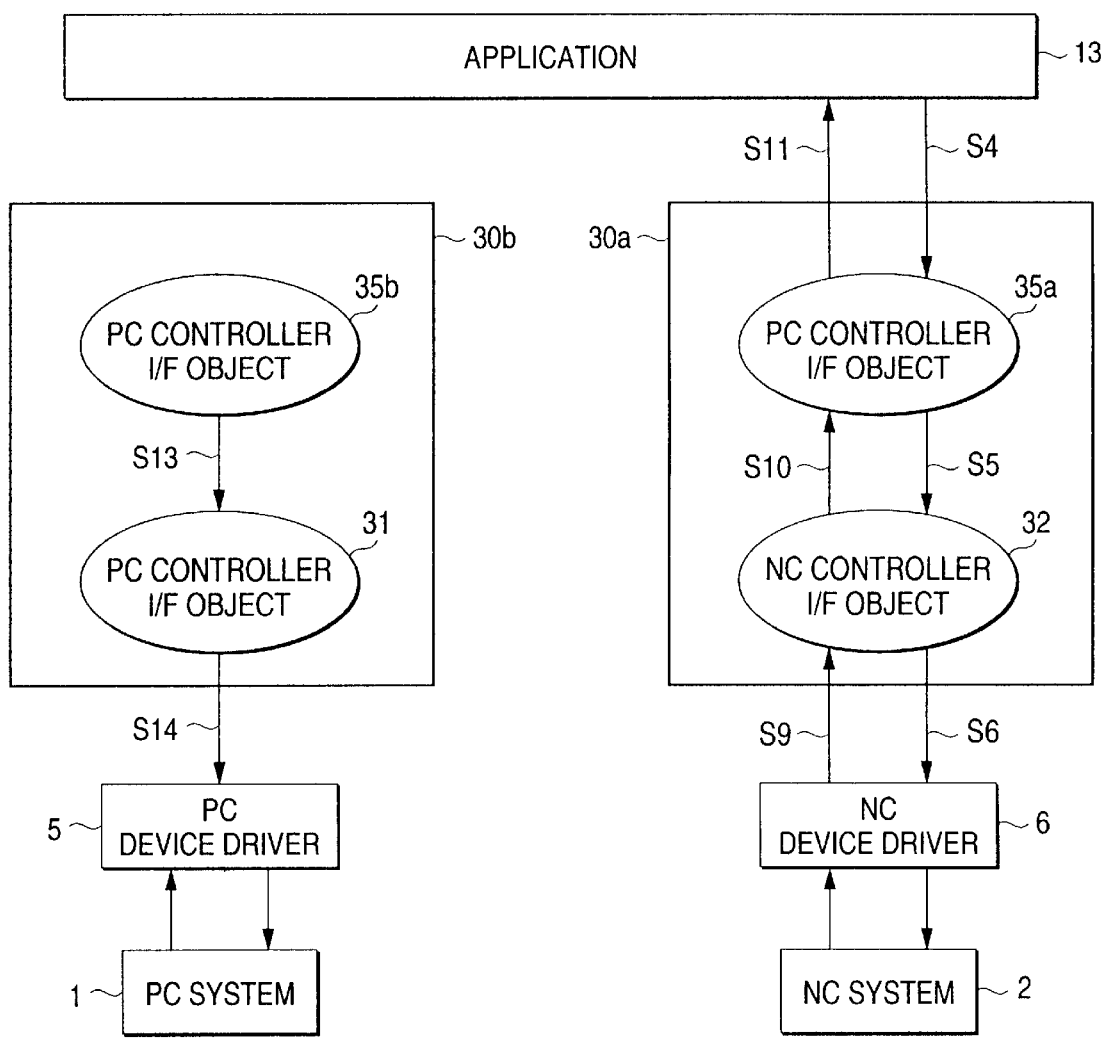
FIG. 9 is a functional block diagram to show the factory automation system in the first embodiment of the invention.

Next, when the application program 13 transmits the second instruction to the NC system 2 at step S4 as shown in FIG. 9, the interface control means 35c of the PC controller I/F object 35a determines whether or not a new thread is to be generated. Here, for example, if it is assumed that the method called at step S4 does not take much time in processing, the interface control means 35c determines that a new thread is not generated, and the control process for the NC system 2 at step S5 and later is performed in the current thread, namely, the PC controller I/F object 35a. This function can be provided, for example, by placing no instruction for generating a new thread in the method of the PC controller I/F object 35a consuming short processing time.

Figure 10:
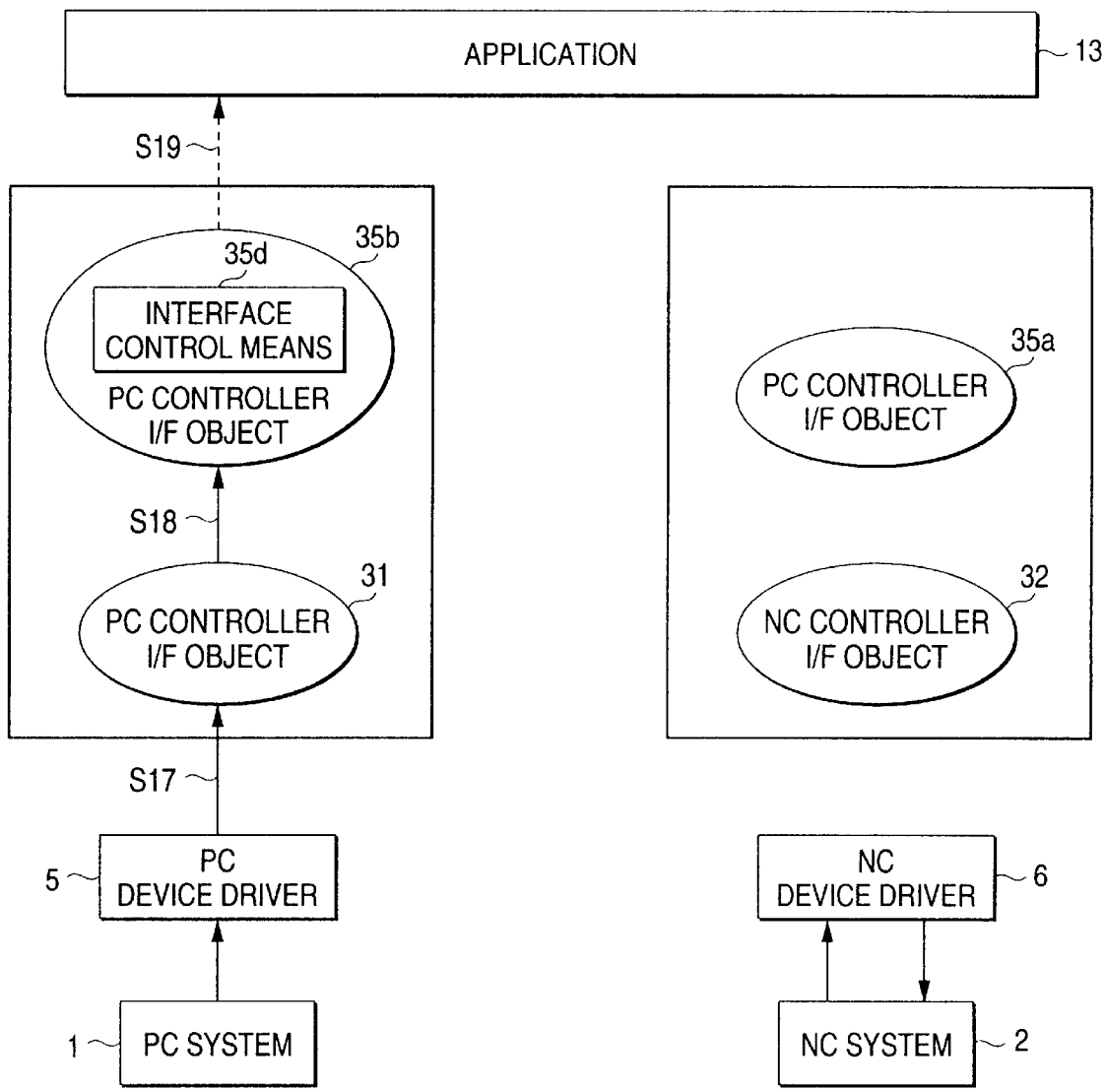
FIG. 10 is a functional block diagram to show the factory automation system in the first embodiment of the invention.

Subsequently, upon completion of the process for the NC system 2 at steps S9 to S11, the PC controller I/F object 35a passes the execution right to the application program 13 as shown in FIG. 10. On the other hand, the PC controller I/F object 35b or the PC communication object 31 executes the first instruction at steps S17 and S18 and the PC controller I/F object 35b transmits the process result for the first instruction to the application program 13 at step S19. Here, the interface control means 35d determines whether or not the first instruction terminates. If the current thread is a new generated one, the thread 13b is terminated, the PC controller I/F object 35b is extinguished as shown in FIG. 6, and again one interface means can be decreased as shown in FIG. 7. In the description given above, the number of interface means is increased from one to two and again is restored to one. However, to increase the number of interface means from two to three and decrease the number from three to two, the personal computer 20 operates in a similar manner and the application program 13 calls the method several times, whereby the library determines whether or not interface means needs to be generated, more than one interface means can be generated, and further the number of interface means can be decreased.

As described above, the number of interface means is increased or decreased as desired in response to the number of instructions for controlling the interface means in parallel, whereby any other process can be executed at high speed without waiting for one process to complete.

The number of interface means is thus decreased, whereby the resources of the CPU time, memory, etc., of the central controller can be used efficiently and speeding down of the central processor because of occupying the resources by unnecessary interface means can be suppressed.

Figure 11:
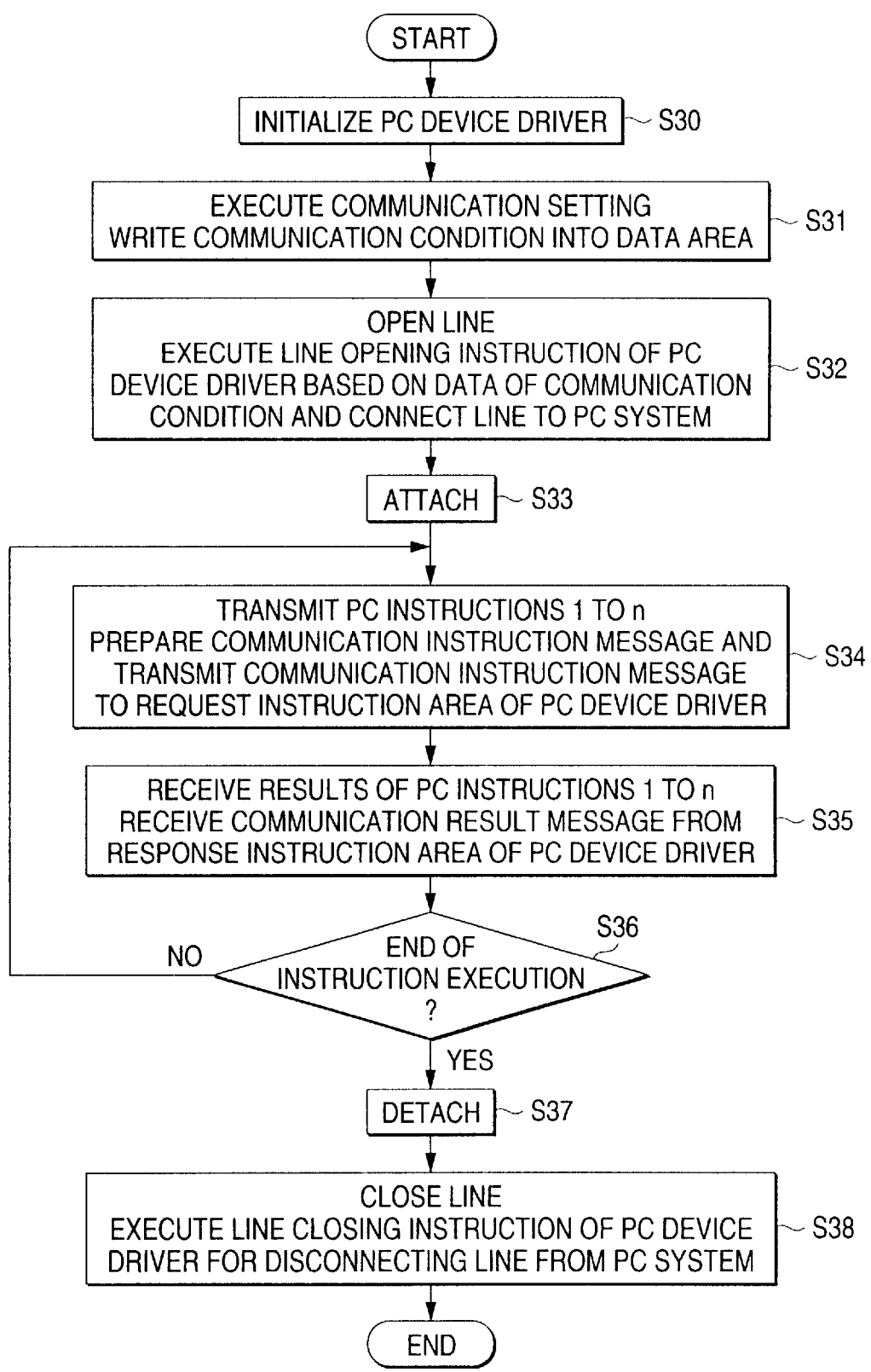
FIG. 11 is a flowchart of an application program in the first embodiment of the invention.
Figure 12:
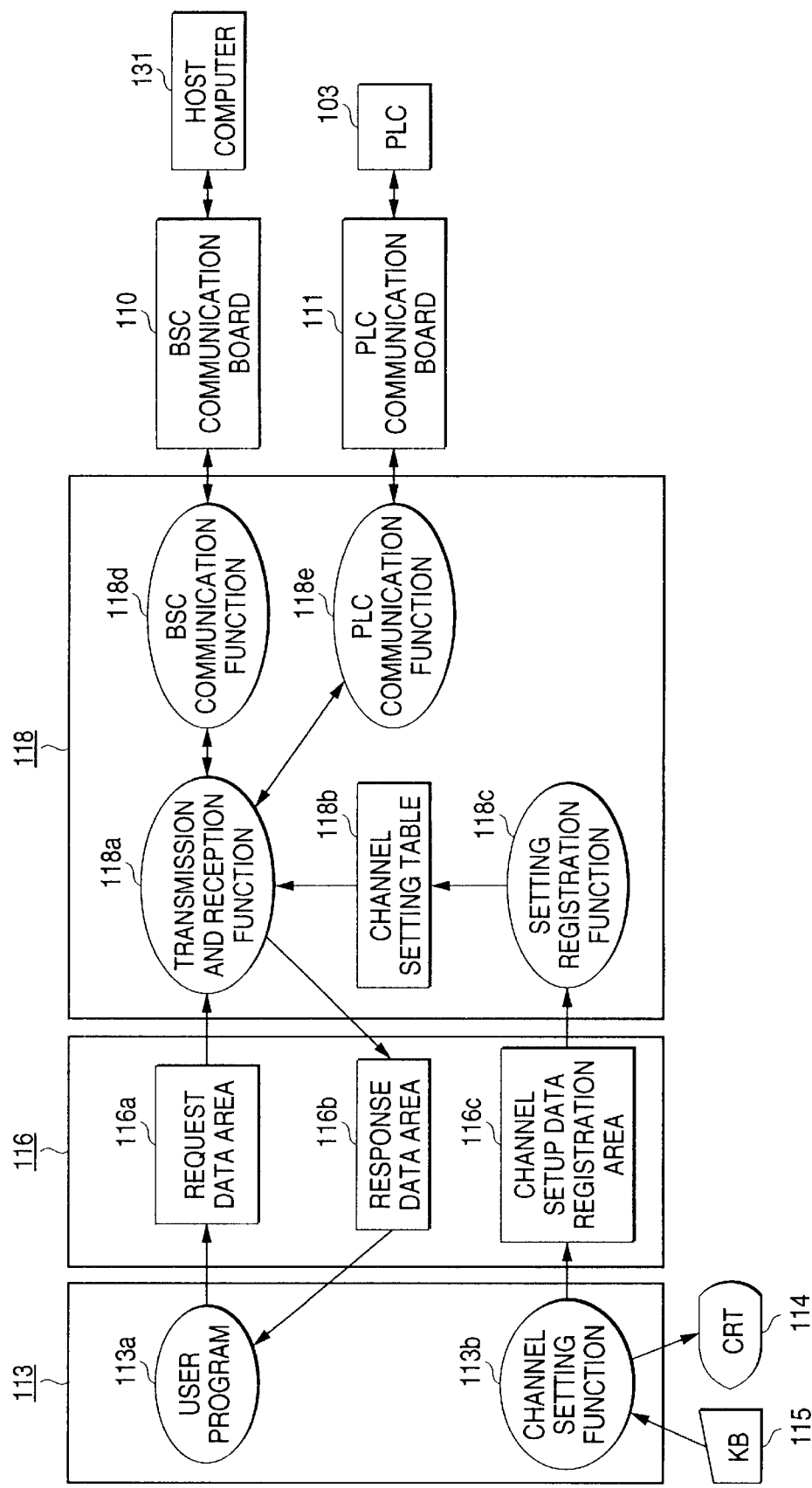
FIG. 12 is a functional block diagram to represent a factory automation system in a related art.

Next, the operation of the application program 13 will be discussed with reference to FIG. 11. In the description that follows, more than one instruction is transmitted to one controller; however, to transmit one instruction to one controller as in the description given above, similar processing can also be executed if the number of instructions transmitted and received and the number of data pieces are changed. FIG. 11 is a flowchart to describe processing of the application program 13 when the controller is controlled.

First, at step S30, the application program 13 instructs the PC communication object 31 to execute an initialization instruction. The PC communication object 31 calls initialization of the PC device driver 5 and initializes the PC system.

Subsequently, at step S31, the PC communication object 31 writes a communication condition into the data area of the PC device driver 5.

Next, at step S32, the PC device driver 5 opens the communication line with the PC system 1 based on the communication condition written into the data area.

Next, at step S33, the application program 13 passes a pointer for connecting to the PC communication object 31 to the PC controller I/F object 35, and the PC controller I/F object 35 connects, namely, attaches to the PC communication object 31. To pass the pointer, the application program 13 writes the pointer to the PC communication object 31 into the data area of the PC controller I/F object 35.

At step S34, the application program 13 transmits n instructions to the PC controller I/F object 35, which then writes the n received instructions into the PC instruction area of the attached PC communication object 31. Subsequently, the PC communication object 31 executes the n PC instructions whenever necessary. For example, when executing the first PC instruction, the PC communication object 31 prepares an instruction message of the first PC instruction and transmits the instruction message to the request instruction area of the PC device driver 5. The PC device driver 5 transmits a request instruction to the PC system 1 over the communication line. Here, the application program 13 transmits n instructions, but the PC controller I/F object 35 may interpret one instruction transmitted by the application program 13 and transmit n instructions predetermined corresponding to the one instruction to the PC communication object 31.

Next, at step S35, the PC device driver 5 receives the processing result for the instruction transmitted at step S32 and the PC communication object 31 receives the processing result as a result message from the response request from the PC device driver 5. The application program 13 receives the processing result through the PC controller I/F object 35. At this time, the application program 13 may receive all results for the n instructions at a time or may receive the result whenever the result of one instruction is produced.

Subsequently, the application program 13 determines whether or not a PC instruction to be executed remains at step S36. If the PC instruction to be executed exists, the application program 13 returns to step S34 and repeats similar processing.

If no PC instructions remain, the application program 13 goes to step S37 and sends a detach command to the PC controller I/F object 35. Upon reception of the detach command, the PC controller I/F object 35 releases the attached PC communication object 31 and disconnects the connection. To detach, the application program 13 writes NULL into the data area of the pointer written at step S33.

If the PC controller I/F object 35 is executed in a different thread and wants to connect to the PC system 1, the PC controller I/F object 35 executed in the different thread may again start the process at step S33. That is, the PC communication object 31 can be again connected from the PC controller I/F object 35 executed in one thread to the PC controller I/F object 35 executed in another thread. In this case, the process of steps S30 to S32 and the like can be skipped, so that processing can be executed at high speed.

For example, any of the communication objects 32 to 34 that can be connected to the controller I/F objects 35 and 36, such as the NC communication object 32, can also be changed in connection from the PC controller I/F object 35 to the motion controller I/F object 36. At the time, if reconnection at step S33 is executed before the line is closed, some steps of opening the line, etc., can be skipped and the operation can be executed at high speed.

Next, at step S38, the application program 13 transmits a "line closing" instruction for closing the line between the personal computer 20 and the controller to the PC communication object 31 via the PC controller I/F object 35. The PC communication object 31, which receives the instruction, transmits the line closing instruction to the PC device driver 5 and the PC system 1 closes the line.

Thus, the PC controller I/F object 35 owns and releases the PC communication object 31 and can execute an operating instruction for the PC system 1 while it owns the PC communication object 31.

Control of the PC system 1 has been described. Similar control is also performed for other controllers 2 to 4. At the time, the PC controller I/F object 35, the motion controller I/F object 36, and the communication objects 32 to 34 corresponding to the controllers 2 to 4 perform the operation corresponding to the description given above.

To exchange data among the communication objects 31 to 34, the controllers 1 to 4 differ in data format, thus data is exchanged using their respective data formats. That is, each of the communication objects 31 to 34 has the data formats of the controllers 1 to 4 connected to the data area as a data member.

As described above, the PC controller I/F object 35 can connect or disconnect each of the communication objects 31 to 34, thereby changing the controllers 1 to 4 to be controlled. Since the NC communication object has PC instructions, for example, as shown in FIG. 4, the PC controller I/F object 35 can attach and own the NC communication object at step S33 in FIG. 11, whereby an operating instruction can be executed for the PC function of the NC system 2 from the PC controller I/F object 35. Likewise, an operating instruction can also be executed for the SC communication object 33 and the RC communication object 34 from the PC controller I/F object 35.

For example, the PC controller I/F object 35 can message the PC function to the NC communication object 32 and the motion controller I/F object 36 can message the motion function to the NC communication object 32. Upon reception of the message, the NC communication object 32 sends a function call to the NC device driver 6 according to the messaging and accesses the NC system 2. The result from the NC system 2 is returned by reversing the above-described route.

Therefore, regardless of the controllers 1 to 4, the application program 13 can message to the PC controller I/F object 35 with respect to the PC function of the application function and can message to the motion controller I/F object 36 with respect to the motion function of the application function, thereby providing any desired result.

Thus, according to the embodiment, the following advantages can also be provided:

When a controller is accessed from the computer (application program), messaging to the controller I/F object corresponding to the function of the controller is executed, whereby it is made possible to access the controller without considering each controller and application development is facilitated. Further, the number of occurrences of trouble can be decreased drastically and a huge load can be taken off the application developer. Also in application development corresponding to a number of controllers, access is enabled as a common function and upgrading and maintenance work of the application program are decreased drastically. The controller I/F objects 35 and 36 and the communication objects 31 to 34 are independent, so that occurrence of a processing delay caused by a communication wait can be suppressed.

The invention, which is configured as described above, provides the following advantages:

In the control method of a factory automation system according to the invention wherein a central controller for controlling a factory automation system using a plurality of controllers controls first and second ones of the controllers, processing can be executed at high speed because the method comprises the generation step of starting a plurality of interface means by generating new interface means in addition to already existing interface means, the first transmission step of transmitting a first instruction for controlling the first controller to one of the interface means by control means being placed in the central controller and having a control procedure of the controllers, the second transmission step of transmitting by the control means a second instruction for controlling the second controller to different one of the interface means from the interface means to which the first instruction is transmitted, the parallel execution step being executed after the first and second transmission steps, the parallel execution step of executing the first instruction by the interface means and executing the second instruction by the different interface means in parallel with execution of the first instruction, the third transmission step being executed after the parallel execution step, the third transmission step of transmitting the process result for the first instruction to the control means by the interface means, the fourth transmission step being executed after the parallel execution step, the fourth transmission step of transmitting the process result for the second instruction to the control means by the different interface means, and the end step being executed after the fourth transmission step, the end step of releasing the resources occupied by the different interface means and terminating the different interface means.

Since the method further comprises the step being executed after the end step, the step of receiving the process result transmitted at the third transmission step and processing the received process result by the control means, the resources occupied by the different interface means are released and the process result received at the third transmission step can be executed at higher speed.

With the recording medium recording a program of the invention, processing can be executed at high speed because a computer is caused to execute the generation step at which if a request for controlling a controller is issued from an application program to a library and a control process provided in the library is called, the library generates a new thread, whereby a plurality of threads are assigned to the library, the return step at which the library uses one of the threads to return execution right to the application program before the library receives the process result from the controller corresponding to the process of the controller, the first control step at which the library uses different one of the threads from the one thread to execute the process of the controller and control the controller in parallel with the application program restarting execution to which the execution right is returned at the return step, and the step being executed after the return step, the step of transmitting the process result of the controller from the library executed using the different thread to the application program executed using the one thread.

Since the computer is caused to execute the additional steps of the request step being executed after the return step at which the application program uses the one thread to request the library to control a different controller, the second control step at which the library receives the request made at the request step and controls the different controller in parallel with the first control step, and the end step being executed after the transmission step at which the library executed using the different thread terminates the different thread, the unnecessarily occupied resources are released and processing can be executed at higher speed.

The central processor of a factory automation system according to the invention can execute processing at high speed because it comprises control means for issuing instructions to a plurality of controllers in parallel and controlling the controllers, a plurality of interface means for connecting the control means and the controllers, and interface control means for dynamically increasing or decreasing the number of the plurality of interface means in response to the number of the instructions issued by the control means to the controllers in parallel.

The interface control means senses that the control means sends an instruction to the interface means, and increases the interface means, so that the labor of controlling the plurality of interface means by the control means is saved and the user can easily program the control means.

The interface control means increases the interface means in response to the type of instruction and for an instruction having a shorter processing time than the instruction for increasing the interface means has, the interface control means does not increase the interface means and causes already existing interface means to execute instruction having a shorter processing time, thus much occupying the resources by the interface means is suppressed and processing can be executed at high speed.

What is claimed is:

1. A control method of a factory automation system wherein a central controller for controlling a factory automation system using a plurality of controllers controls first and second ones of the controllers, said method comprising:

a generation step of starting a plurality of interface means by generating new interface means in addition to already existing interface means;

a first transmission step of transmitting a first instruction for controlling the first controller to one of the interface means by control means being placed in the central controller and having a control procedure of the controllers;

a second transmission step of transmitting by the control means a second instruction for controlling the second controller to different one of the interface means from the interface means to which the first instruction is transmitted;

a parallel execution step being executed after said first and second transmission steps, said parallel execution step of executing the first instruction by the interface means and executing the second instruction by the different interface means in parallel with execution of the first instruction;

a third transmission step being executed after said parallel execution step, said third transmission step of transmitting the process result for the first instruction to the control means by the interface means;

a fourth transmission step being executed after said parallel execution step, said fourth transmission step of transmitting the process result for the second instruction to the control means by the different interface means; and an end step being executed after said fourth transmission step, said end step of releasing resources occupied by the different interface means and terminating the different interface means.

2. The method as claimed in claim 1 further comprising the step being executed after said end step, said step of receiving the process result transmitted at said third transmission step and processing the received process result by the control means.

3. A recording medium recording a program for causing a computer to execute:

a generation step at which if a request for controlling a controller is issued from an application program to a library and a control process provided in the library is called, the library generates a new thread, whereby a plurality of threads are assigned to the library;

a return step at which the library uses one of the threads to return execution right to the application program before the library receives the process result from the controller corresponding to the process of the controller;

a first control step at which the library uses different one of the threads from the one thread to execute the process of the controller and control the controller in parallel with the application program restarting execution to which the execution right is returned at the return step; and a step being executed after the return step, the step of transmitting the process result of the controller from the library executed using the different thread to the application program executed using the one thread.

4. The recording medium as claimed in claim 3 recording a program for causing a computer to execute the additional steps of:

the request step being executed after the return step at which the application program uses the one thread to request the library to control a different controller;

the second control step at which the library receives the request made at the request step and controls the different controller in parallel with the first control step; and the end step being executed after the transmission step at which the library executed using the different thread terminates the different thread.

5. A central processor of a factory automation system comprising:

control means for issuing instructions to a plurality of controllers in parallel and controlling the controllers;

a plurality of interface means for connecting said control means and the controllers; and interface control means for dynamically increasing or decreasing the number of said plurality of interface means in response to the number of the instructions issued by said control means to the controllers in parallel.

6. The central processor as claimed in claim 5 wherein said interface control means senses that said control means sends an instruction to said interface means, and increases said interface means.

7. The central processor as claimed in claim 6 wherein said interface control means increases said interface means in response to the type of instruction and for an instruction having a shorter processing time than the instruction for increasing said interface means has, said interface control means does not increase said interface means and causes already existing interface means to execute the instruction having a shorter processing time.

* * * * *